United States Patent [19]

Giannuzzi

[11] Patent Number: 4,770,734
[45] Date of Patent: Sep. 13, 1988

[54] BRACKET LOADING DEVICE FOR ROBOT

[75] Inventor: Ottavio Giannuzzi, Baldwin, N.Y.

[73] Assignee: Grumman Aerospace Corporation, Bethpage, N.Y.

[21] Appl. No.: 906,054

[22] Filed: Sep. 11, 1986

[51] Int. Cl.⁴ ............................................. B31F 5/00
[52] U.S. Cl. .................................. 156/250; 156/350; 156/362; 156/556; 156/571; 414/224; 414/737; 901/40
[58] Field of Search ............... 156/556, 552, 571, 566, 156/568, 561, 558–559, 297, 299, 350, 250, 256, 362; 901/6, 7, 43, 40; 414/224, 225, 737; 29/428, 529, 703, 714

[56] References Cited

U.S. PATENT DOCUMENTS

| | | |
|---|---|---|
| 2,652,161 | 9/1953 | Herzig et al. . |
| 2,792,810 | 5/1957 | Maconeghy et al. . |
| 3,415,388 | 12/1968 | Hornlein et al. . |
| 3,542,241 | 11/1970 | Middleditch . |
| 3,609,938 | 12/1968 | Paddock . |
| 3,696,596 | 3/1970 | Wegscheid . |
| 3,696,942 | 10/1972 | Kitchener et al. . |
| 3,723,006 | 3/1973 | Thomas, Jr. . |
| 3,857,496 | 12/1974 | Gonzales . |
| 3,896,940 | 7/1975 | Birrell . |
| 3,958,740 | 5/1976 | Dixon ................................. 901/6 X |
| 4,322,067 | 3/1982 | Masselin et al. . |
| 4,613,392 | 9/1986 | Klar et al. ...................... 156/541 X |

Primary Examiner—David Simmons
Attorney, Agent, or Firm—Pollock, VandeSande & Priddy

[57] ABSTRACT

A vacuum part handling device, attached to a robot, serially picks up magazine-loaded brackets and passes them over a double-sided adhesive tape applicator. A strip of tape is secured to a bracket flange and the robot moves the vacuum-held bracket to a final location. The handling device urges the taped flange against a structural member where it is temporarily attached at a precise position enabling accurate automatic insertion of fasteners.

7 Claims, 3 Drawing Sheets

BRACKET LOADING DEVICE FOR ROBOT

FIELD OF THE INVENTION

The present invention is directed to robotic devices, and more particularly to a vacuum handling mechanism for loading brackets into a robotic tool.

BRIEF DESCRIPTION OF THE PRESENT INVENTION

In the construction of aircraft bodies, a very large number of brackets must be employed to connect structural members to which aircraft skin is attached.

Conventionally, this is a manual operation requiring the time-consuming and costly use of hand tools by trained assemblers. As aircraft become more complex, the magnitude of assembly problems becomes increased. Therefore, in recent years, more thought has been given to the use of robots to secure mating structural members by brackets. Although robotic devices are capable of grasping and positioning brackets in precise locations, a problem exists in temporarily retaining the position of these brackets before another robotic tool can be employed to permanently fasten the brackets in position. If this could be achieved, a large number of brackets could be temporarily positioned in place, one after the other; and then, fasteners could quickly attach the brackets to aircraft structural members.

BRIEF DESCRIPTION OF THE PRESENT INVENTION

The present invention offers an automated means for feeding brackets over an adhesive tape applicator utilizing a vacuum handling device prior to picking up the prepared bracket and temporarily positioning it at a precise location between adjacent structural parts. The adhesively prepared bracket will stay in its precisely located position even in an industrial environment where light vibration may be encountered. With the brackets temporarily secured in these precise locations, robotic machines may follow up by inserting fasteners in holes located in the brackets and in structural members without experiencing minor displacements of the brackets which would prevent proper precise alignment between fasteners and holes.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
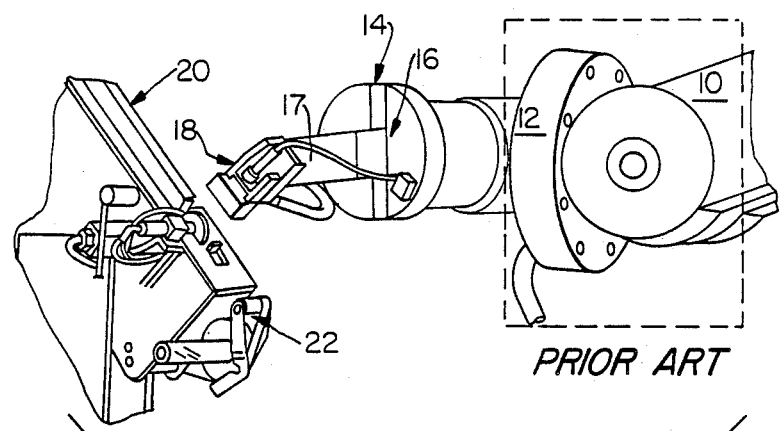
FIG. 1 is a perspective view of the invention connected to a robot.

FIG. 1 illustrates an overview of the present invention as employed with a robotic multi-tool device 10, such as manufactured by ASEA Company of Sweden. The robotic device is equipped with a pneumatic-electrical rotating head to which a rotatable vacuum tool 14 is attached. The tool 14 basically includes an air-electrical manifold 16 which mounts, via arm 17, a vacuum part handling device 18.

In a preferred embodiment of the invention, the vacuum part handling device 18 individually handles a supply of brackets which are stored in magazine 20. As each bracket is delivered from the magazine, it is displaced over a double-sided adhesive tape applicator 22 prior to its being picked up by the vacuum part handling device 18. As will be explained in greater detail in connection with FIGS. 4 and 5, the applied adhesive tape enables the bracket to be temporarily and securely positioned in place against structural members prior to securement of the bracket by fasteners.

Figure 2:
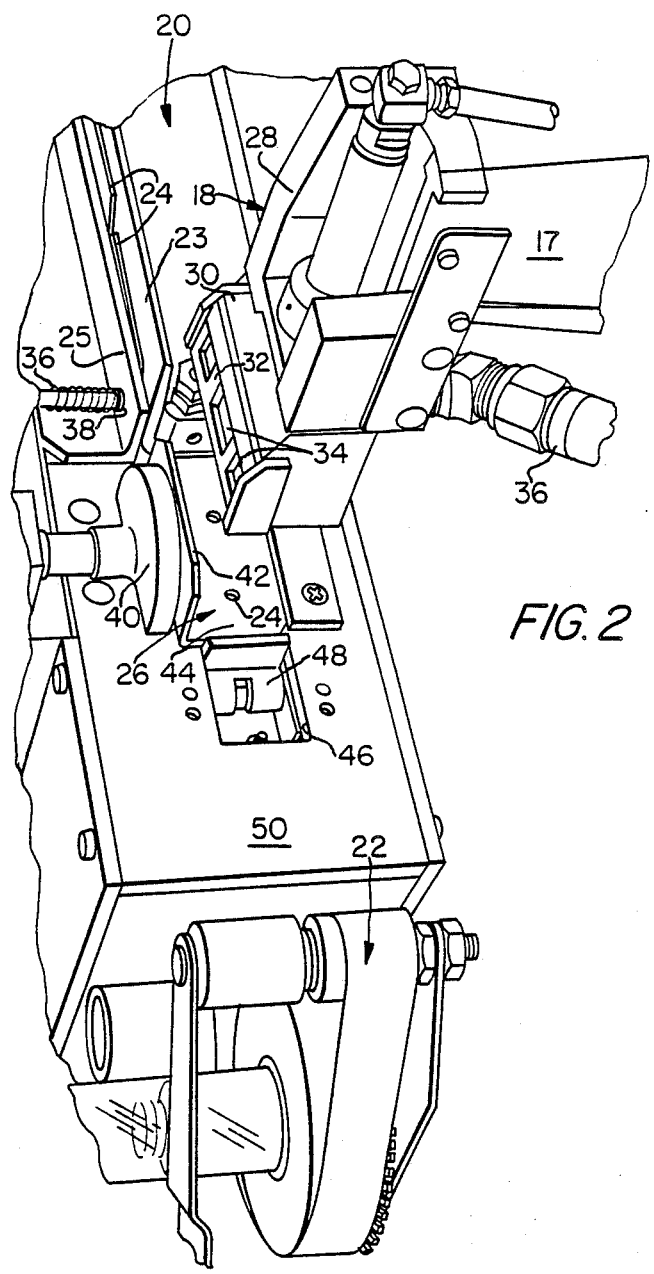
FIG. 2 is a generally top view of the invention.

FIG. 2 illustrates in detail the magazine 20 and the vacuum part handling device 18. The magazine 20 is seen to store a number of linearly positioned L-brackets 24, which are held in a loaded condition by flanges 23 and 25 which form an elongated channel. The flanges are spaced to permit the brackets to exit from the magazine one at a time. As each bracket is dispensed by magazine 20, it becomes positioned at an exit location generally indicated by reference numeral 26. In this position, the vacuum part handling device 18 may be brought into contact with the bracket and deliver it from the magazine to a selected fabrication location.

The vacuum part handling device 18 is seen to include a base shoe 28 connected to an outward end of arm 17, the opposite end of the arm being connected to manifold 16. At the illustrated bottom portion of base shoe 28 is a vacuum foot 30 having a rubber pad 32 characterized by openings 34, which allow vacuum forced securement of a bracket to the vacuum foot when the latter is lowered into contact with a bracket at location 26.

In order to serially feed one bracket to position 26 at any instant of time, a spring-biased solenoid-driven plunger 36 normally protrudes through an opening 38 in magazine flange 25. When the plunger 36 is normally biased through the opening 38, the line of brackets 24 are prevented from gravitationally feeding down to the loading location 26 of the magazine. Upon actuation of a driving solenoid, the plunger 36 is retracted thereby enabling the lowermost positioned bracket to move from between flanges 23 and 25 to location 26. The bracket is stopped at location 26 due to a spring-loaded gate 48 extending upwardly from a generally rectangular opening formed in the lower surface 50 of inclined magazine 20. When a bracket is retained in location 26, arm 17 of the vacuum part handling device lowers the vacuum foot 30 against the horizontally illustrated flange 44 of the bracket at location 26. When this step is completed, pneumatically driven plunger 40 is extended outwardly to urge the bracket at location 26 against the vacuum foot 30. Specifically, flange 42 of the bracket is urged against the rubber pad 32 where it is held by vacuum pressure. Thereafter, the vacuum part handling device 28 moves the bracket from location 26 to a double-sided adhesive tape applicator, as generally indicated by reference numeral 22, the latter being located at the lower end of magazine 20.

Figure 3:
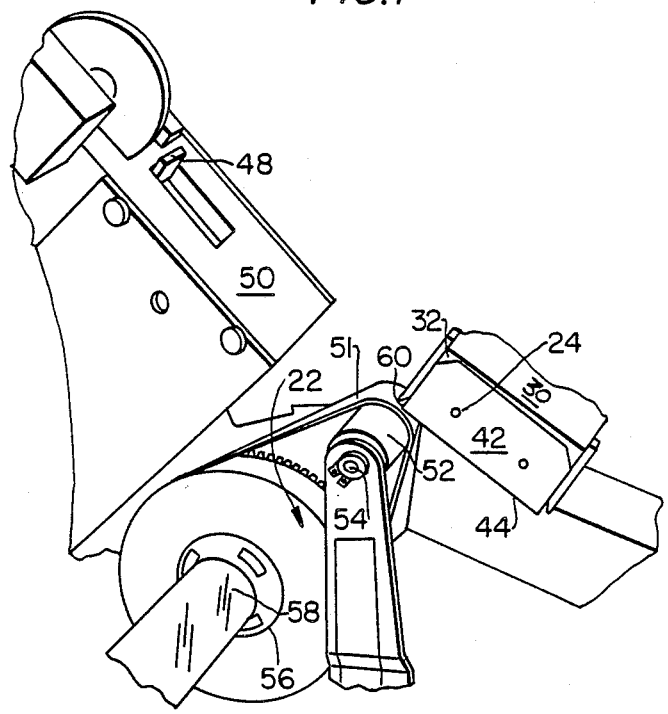
FIG. 3 is a side view of the invention, illustrating the application of adhesive tape onto a bracket.

FIG. 3 illustrates the displacement of a bracket 24 across the tape applicator 22. The applicator includes a supply roll 56, which supplies a length of double-sided adhesive tape 51 to a smaller take-up roller 52. The rolls 56 and 52 are respectively mounted to parallel spaced shafts 58 and 54. As the lower flange 44 of bracket 24 is about to leave the take-up roller 52, the rear edge 60 of the bracket is tilted downward against the tape thereby causing it to cut the tape cleanly. A subsequent identical application of double-sided tape will then occur for the next bracket which is moved against the take-up roller 52. With a length of adhesive tape attached against the lower-illustrated flange 44 of bracket 24, the bracket may now be moved toward its final destination, as illustrated in FIG. 4.

Figure 4:
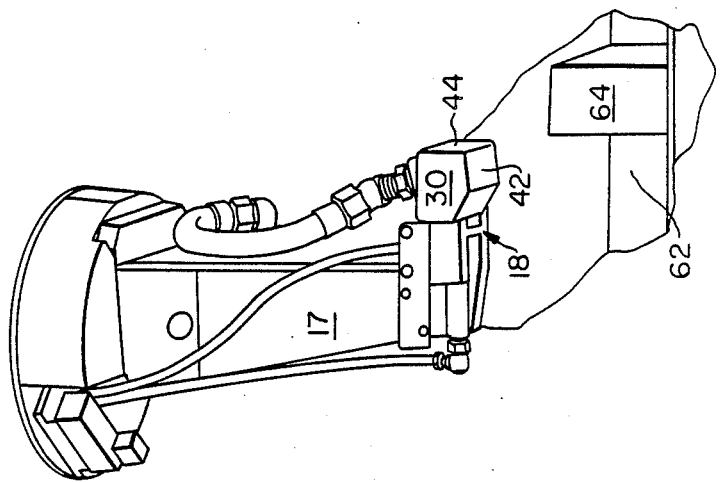
FIG. 4 is a front elevational view of the invention prior to attachment of the bracket to structural members.

In FIG. 4, the arm 17 and the vacuum part handling device 18 are illustrated as having been rotated so as to allow the vacuum retained bracket flange 44 to be pressed against structural member 64, which is located at some distance from magazine 20. The conclusion of this displacement is illustrated in FIG. 5.

Figure 5:
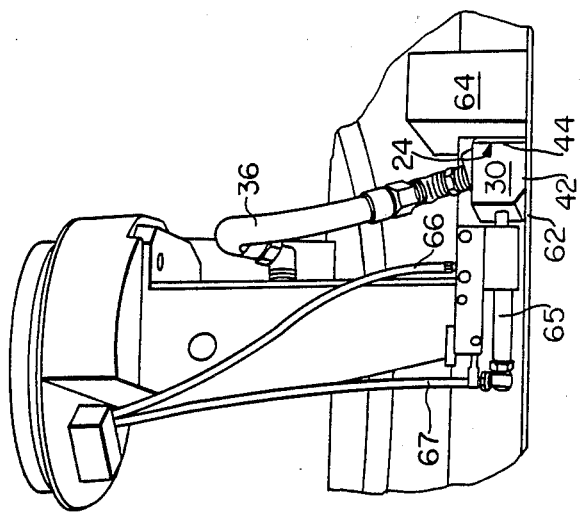
FIG. 5 is a front elevational view of the invention showing attachment of the bracket to structural members.

Prior to reaching the final deployed position as shown in FIG. 5, the vacuum foot 30 moves the bracket flange 42, which is not prepared with adhesive tape, against surface 62 of a first structural member. Pneumatic lines 66 and 67 operate plunger 65, to which vacuum foot 30 is attached. This permits the vacuum foot 30 to gently press bracket 24 against second structural member 64. Vacuum line 36 is then made inoperative so that the bracket 24 may be released from the vacuum foot 30. Upon retraction of plunger 65, the vacuum foot 30 withdraws and bracket 24 will be temporarily secured at a precise location to the adjacent structural members 62 and 64.

This enables the robotic device to return to a home position and repeat the operation for the placement of the next bracket in magazine 20.

After the described invention is successfully employed, fasteners (not shown) may be precisely located in fastener holes (not shown) formed in the brackets. The subsequent deployment of fasteners may occur with the same robotic device as is employed with the brackets, or a separate robotic device. The particular means of fastening the bracket is not part of the present invention.

Although the present invention has been described in terms of temporarily securing brackets, it is to be understood that the invention is not limited to brackets. Rather, the present invention may be employed with a host of mechanical connectors. Further, although the present invention has been described in the environment of aircraft fabrication, it is to be understood that it is equally applicable for deployment of connection devices to a wide variety of assemblies.

It should be understood that the invention is not limited to the exact details of construction shown and described herein, for obvious modifications will occur to persons skilled in the art.

I claim:

1. A system, adapted for use with a robot, for handling mechanical connectors during an assembly of structural members, the system comprising:
   a magazine for dispensing the connectors one at a time;
   vacuum means for holding a connector after being dispensed;
   means for dispensing linearly continuous double-sided adhesive tape;
   means for moving the vacuum means from the magazine
      (a) to the dispensing means so that a length of the tape is applied to the connector;
      (b) and away from the dispensing means so that an edge of the connector cuts the length of tape in preparation of affixing the connector to a structural member.

2. The structure set forth in claim 1 wherein the magazine includes:
   means for gravitationally channeling the connectors along a preselected path;
   means for feeding the connectors to an exit location, one at a time; and
   means for displacing a connector at the exit location into contact with the vacuum means.

3. The structure set forth in claim 1 wherein the tape-dispensing means comprises:
   a tape supply roll; and
   a tape take-up roller positioned in proximity to the supply roll, the connector being displaced tangentially across the take-up roller for applying the tape to the connector.

4. The structure set forth in claim 1 wherein the vacuum means comprises a pad for contacting a connector, the pad having openings formed therein for communicating with a vacuum source.

5. The structure set forth in claim 2 wherein the tape-dispensing means comprises:
   a tape supply roll;
   a tape take-up roller positioned in proximity to the supply roll, the connector being displaced tangentially across the take-up roller for applying the tape to the connector; and
   further wherein the vacuum means comprises a pad for contacting a connector, the pad having openings formed therein for communicating with a vacuum source.

6. A method for holding mechanical connectors during assembly, the method comprising the steps:
   gravitationally dispensing the connectors along a preselected path, one at a time;
   displacing a connector into contact with a vacuum connector holding means;
   dispensing linearly continuous double-sided adhesive tape to the connector as the holding means displaces the connector from a dispensing point; and
   forcing a trailing edge of the connector against the tape thereby cutting the tape to a needed length;
   thereby preparing the connector for attachment to a structural member.

7. The method set forth in claim 6 together with the step of moving a tape-free surface of the connector against a first structural member;
   sliding the connector along the first structural member until a surface of the connector covered with tape engages a second structural member;
   de-activating the vacuum-holding means; and
   withdrawing the holding means thereby retaining the connector against the structural members in preparation of fastening the connector to the structural members.

* * * * *